July 9, 1957
P. MORICEAU
2,798,419
DISC TILLER CONSTRUCTION
Filed May 4, 1954
3 Sheets-Sheet 1
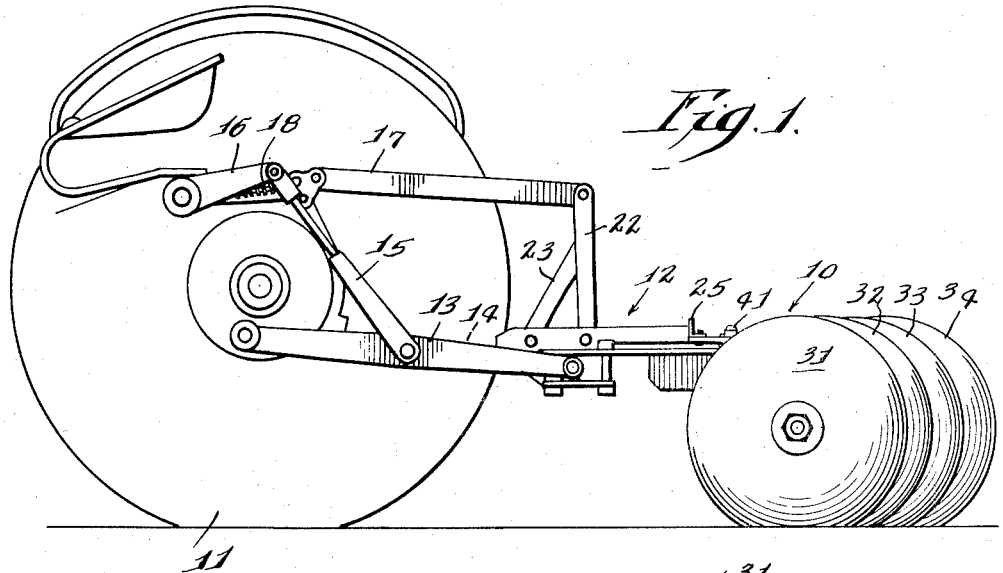
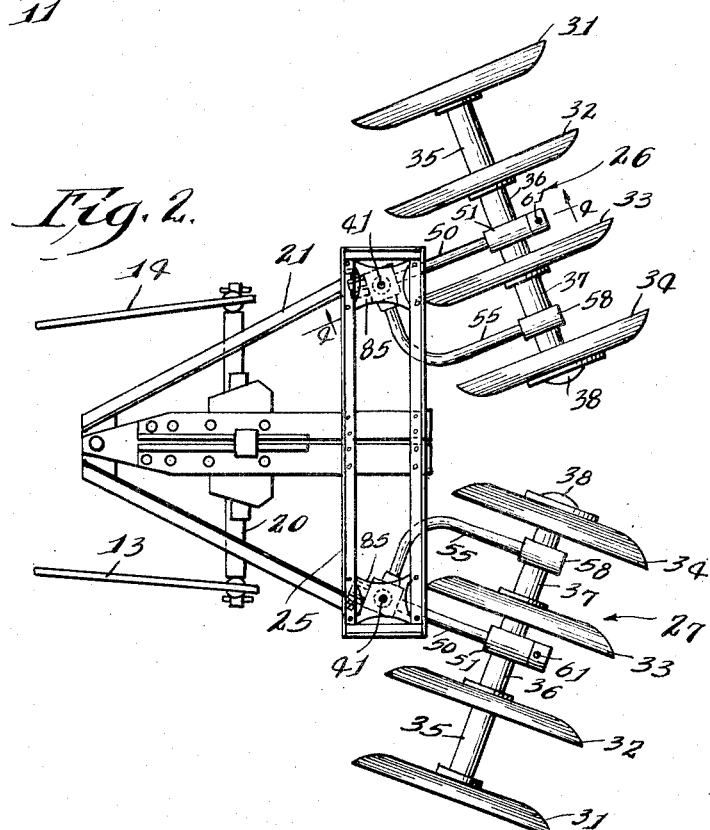
Inventor.
Pierre Moriceau.
By Carlsen, Pitzner, Hubbard & Wolfe
Attorneys

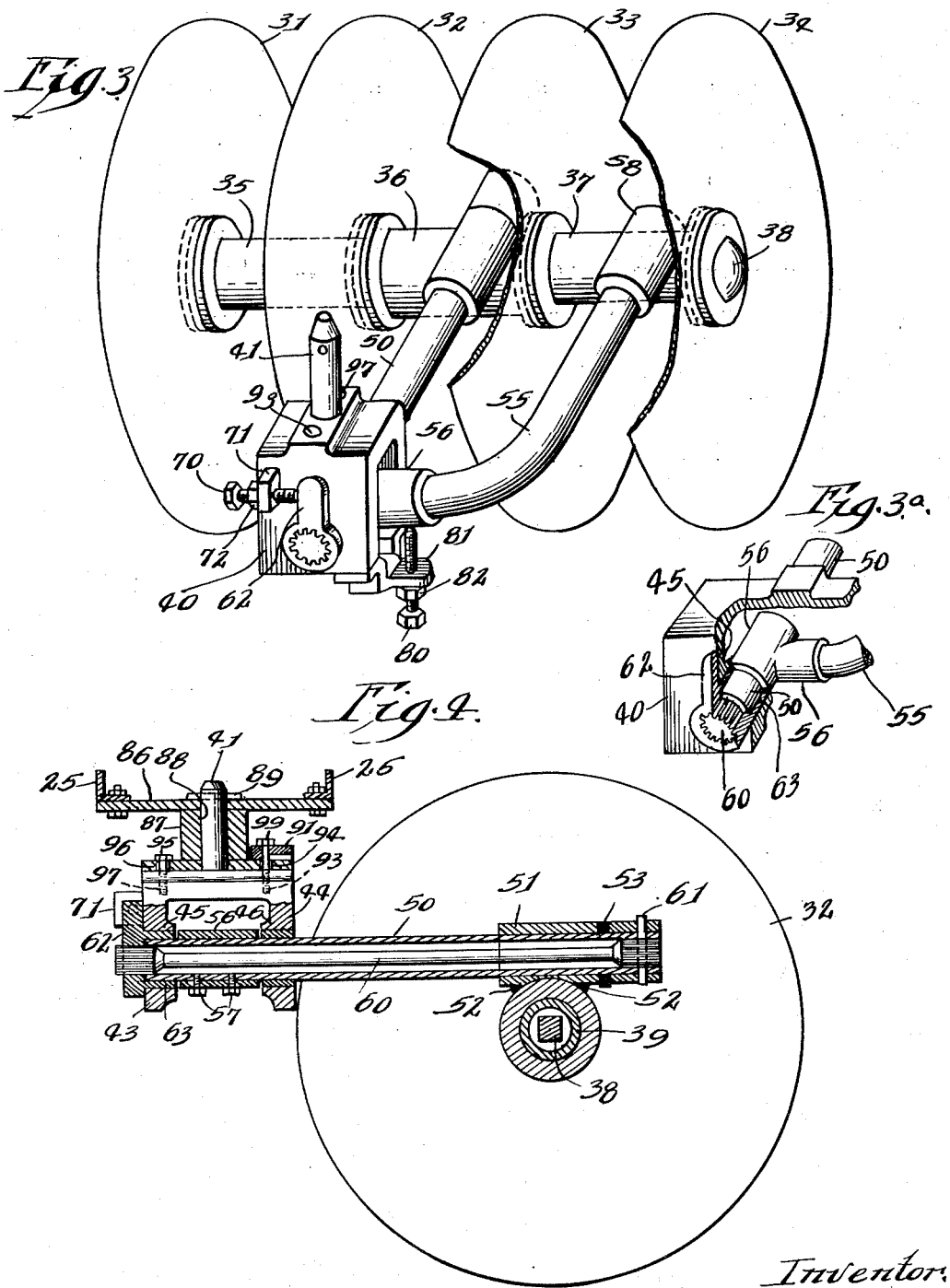

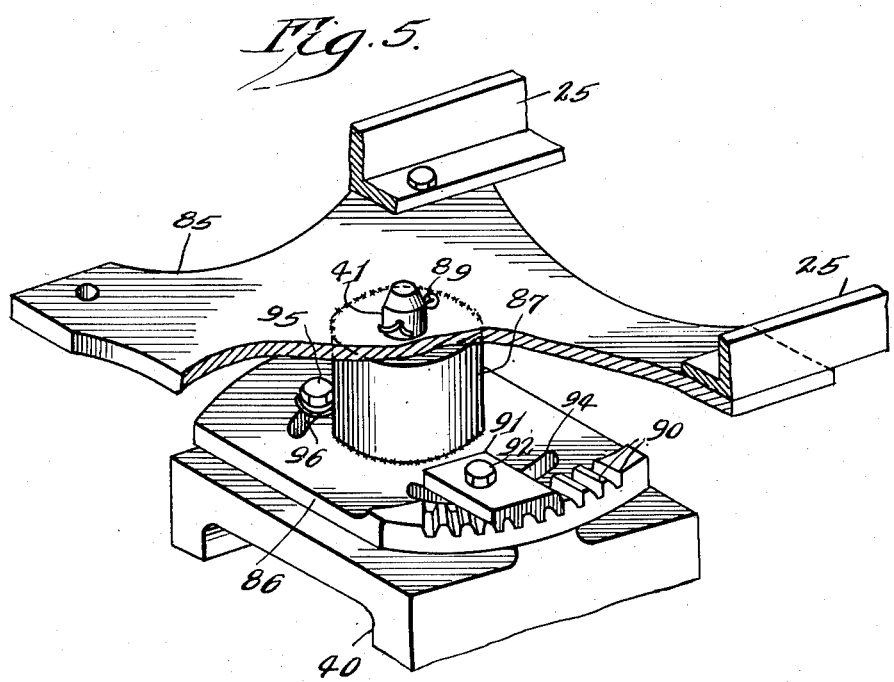
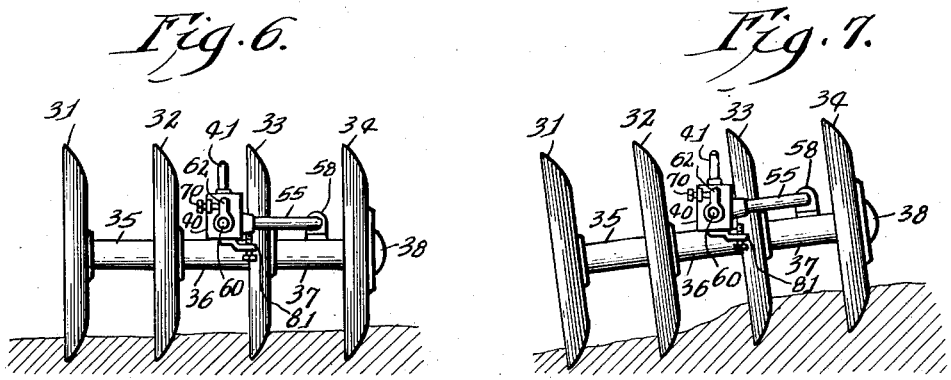

United States Patent Office 2,798,419
Patented July 9, 1957

2,798,419

DISC TILLER CONSTRUCTION

Pierre Moriceau, Chaville, France, assignor to Harry Ferguson de France, Societe Anonyme Application May 4, 1954, Serial No. 427,549

8 Claims. (Cl. 97—54)

The present invention relates to disc-type implements, and more particularly to means for mounting a disc gang on a tractor or the like.

It is an object of the invention to provide a disc tiller in which the disc gang is mounted in a novel fashion for tilting movement about a horizontal axis, enabling the gang more readily to accommodate itself to ground irregularities such as found in orchards and vineyards. It is another object to provide a disc tiller of the above type in which the disc gang occupies a normal position and in which any tendency to depart from the normal position is resiliently resisted, enabling the gang to tilt in response to excessive soil reaction or to clear an obstruction. It is a further object to provide a disc tiller which is resiliently based toward a normal position and in which novel means are provided for permitting several different types of operation in accordance with the soil conditions and the desires of the operator.

It is still another object to provide a disc tiller in which the disc gang may be easily and quickly adjusted about a vertical axis for a desired angle of attack. It is an object to provide a disc tiller which is effective in operation, convenient and flexible in adjustment, and durable in the face of hard usage. Finally, it is an object to provide a disc tiller which is inexpensive to manufacture and which is distinguished by a clean and straightforward appearance. Other objects and advantages of the invention will become apparent upon reading the attached detailed description and upon reference to the drawings, in which:

Figure 1 is an elevation showing an implement constructed in accordance with the present invention connected to a tractor of conventional type.

Fig. 2 is a plan view of the implement shown in Fig. 1.

Fig. 3 is a perspective of one of the disc gangs and associated mounting bracket.

Fig. 3a is a fragmentary view showing the bracket in partial section.

Fig. 4 is a vertical section taken along the line 4—4 in Fig. 2.

Fig. 5 is a fragmentary perspective showing the adjustment between mounting bracket and implement frame.

Fig. 6 is a front elevation of one of the disc gangs on level ground.

Fig. 7 shows the action of the disc gang in Fig. 6 upon striking a ground irregularity or obstruction.

While the invention has been described in connection with the preferred embodiment, it will be understood that I do not intend to limit myself to such embodiment, but intend to cover all modifications and alternative constructions included within the spirit and scope of the appended claims.

Turning now to the drawings, a disc tiller indicated generally at 10 is coupled to a tractor 11 by means of a hitch 12. The tractor 11, of which only the rear portion is shown, will be recognized as a tractor of the Ferguson type having a pair of draft links 13, 14 trailingly pivoted at its rear end. The draft link 13 is supported by a drop link 15 which is connected to a lift arm 16. Extending rearwardly from the tractor and centered above the draft links is a top link 17, which is outwardly biased by means of a spring 18. The tractor includes a power lift mechanism (not shown) for raising the lift arms in accordance with the inward pressure exerted upon the top link 17, thereby to establish what is known in the art as depth control.

The hitch 12 includes a drawbar 20 connected to the trailing ends of the draft links. Mounted on the drawbar 20 is a generally triangular frame 21 having a vertical member 22, the upper end of which is pivotally connected to the top link 17, the member 22 being rigidly braced relative to the triangular frame by a brace 23.

Extending across the rear portion of the triangular frame is a transverse implement frame 25 mounting disc gangs 26, 27. For the purpose of illustration, the disc gang 26 and its associated mounting will be taken as representative, the opposite disc gang 27 simply being a mirror image of the other. The disc gang 26, as shown in Fig. 3, is seen to include four discs 31–34, the discs being concave as is conventional. Arranged between the discs are relatively rotatable collars 35, 36, 37, the discs and collars being telescoped over a shaft 38. The collars may be rotatably supported in the conventional way, for example, on sleeve bearings 39 (Fig. 4).

For the purpose of mounting the disc gang 26 a bracket 40 is provided having a vertically extending pin 41, which is received in the implement frame 25. The means employed for clamping the bracket is covered at a later point. Detailed attention will first be given to the members interconnecting the bracket 40 and the disc gang, particular reference being made to Figs. 3 and 4.

The bracket 40 is of rigid box-like construction and is in the form of an inverted U having opposed walls 43, 44 with alined bores 45, 46. Journaled in the bracket 40 is a rearwardly extending tubular support 50. This support is received at its rear end in a reinforcing sleeve 51 to which is, in turn, welded as shown at 52 or otherwise secured to the collar 36 of the disc gang. The sleeve 51 is preferably fixed to the tubular support 50, for example, by welding, as indicated at 53. For the purpose of applying torque to the disc gang about a tilt axis, a laterally extending gooseneck 55 is provided. The forward portion of the gooseneck is received in a T coupling 56 (see Fig. 3a), which is rigidly secured to the tubular support 50 by means of screws 57 or the like. The gooseneck terminates in a reinforcing sleeve 58 which is welded or otherwise secured to the top of the rotatable collar 37 in the disc gang. Thus, the tubular support 50 and the gooseneck 55 form a sturdy gang-supporting framework, engaging spaced collars between the discs.

In accordance with the present invention, a novel torsion bar arrangement is provided for rotationally biasing the supporting members 50, 55 and the connected disc gang relative to the bracket 40. This is accomplished in the present instance by the torsion bar 60, which is telescoped in the tubular support 50. The torsion bar is pinned to the tubular support at its rear end by a pin 61. At its forward end the torsion bar is splined and received in a lever 62. Such lever includes an integral sleeve extension 63 which is rotatably mounted in the bracket 40 as shown in Fig. 4, serving as a bearing for the forward end of the support 50. For the purpose of positioning the lever 62 at the end of the torsion bar, and thereby adjusting the effective amount of torsion when the disc gang rides in contact with the ground, a torsion-adjusting screw 70 is provided which is threaded into a projection 71 integrally formed on the bracket. The torsion-adjusting screw 70 is maintained in adjusted position by means of a locking nut 72. Since the rear end of the torsion bar is anchored to the supporting members 50, 55 for the disc gang and since the front end of the torsion bar is, in effect, anchored to the bracket 40, the torsional stress tends to tilt the gang in the clockwise direction as viewed in Fig. 3.

In order to position the disc gang in a desired normal position relative to the bracket and supporting frame, an adjustable stop 80 is provided in the form of a screw which is threaded into a small bracket 81 mounted on the underside of the main bracket 40, the tip of the screw being arranged in the path of tilting movement of the gooseneck supporting member 55. The screw is locked in position by a locking nut 82.

Prior to discussing the operation of the implement, attention may be given to the means for mounting the bracket 40 in the implement frame 25 (Figs. 4 and 5). Mounted at one end of the implement frame 25 is a frame plate 85 having a mounting plate 86 rigidly fastened thereto by a post or spacer 87. The post 87 may be welded to both of the plates, as indicated. Extending through the post and the associated plates is a bore 88 for receiving the pin 41 on the bracket 40, the pin being held in place by a cotter pin 89 or the like. In order that the bracket 40, which mounts the disc gang, may be rotationally fixed relative to the implement frame, the mounting plate 86 is provided with a toothed sector 90. Engaging the toothed sector is a locking member 91 having registering teeth. The locking member 91 is fastened in place by a bolt 92, which is threaded into a hole 93 provided in the upper surface of the bracket 40. Clearance for the bolt 92 is provided by an arcuate slot 94 formed in the mounting plate 86. The mounting plate 86 is additionally clamped to the bracket 40 by means of a screw 95, which is diametrically arranged with respect to the screw 92, and which extends through an arcuate slot 96 and into a threaded hole 97 on the upper surface of the bracket 40. It will be apparent that the above construction enables the bracket 40 and its associated disc gang to be securely clamped in a desired angle of attack. In practice the gangs may occupy the position shown in Fig. 2, in which the earth tends to discharge outwardly from the centerline of the implement. In order to change the angle of attack of the disc gang 26, the bolts 92, 95 are simply loosened, thereby disengaging the locking member 91, after which the assembly is reclamped in a new position.

The operation of the disc tiller employing the present invention is illustrated more or less diagrammatically in Figs. 6 and 7. The adjustable stop 80, as stated, determines the normal position of the supporting frame consisting of the members 50, 55. Under normal operating conditions the adjustable stop may be positioned so that the disc gang occupies a horizontal position, as shown in Fig. 6; however, in most instances it will be desirable to back off the adjustable stop 80, so that the disc gang occupies a position a few degrees clockwise from that shown in Fig. 6, with the innermost disc 34 engaging the earth somewhat more deeply than the outer disc 31. The amount of torsion tending to maintain the disc gang in its adjusted position is determined by the setting of the torsion adjusting screw 70. Where it is desired that the disc gang yield rather easily to follow the earth contour, the torsion setting may be relatively light. Under such circumstances, the disc gang will tend to ride up on an obstruction or hillock as illustrated in Fig. 7, the gooseneck 55 floating clear of the adjustable stop 80. This yielding movement of the disc gang tends to cultivate the surface without undue leveling, as is frequently desirable in orchards and vineyards. The tractor may for example be driven along a slight ridge without leveling it. Where an increased leveling action is desired, the torque-adjusting screw 70 may be screwed inwardly so that the torque tending to maintain the disc gang in its normal position is increased. This will tend to cause low ridges and minor irregularities encountered by the disc gang to be leveled, while permitting yielding movement of the disc gang when an obstruction such as a rock or buried stump is encountered.

It is apparent from the foregoing that two rather distinct types of operation may be secured by making the torsion setting either resilient or stiff, and any in-between setting is available to the operator for intermediate conditions. Further flexibility of adjustment is provided by the adjustable stop 80, which determines the normal tilt angle of each of the disc gangs. It is to be noted, however, that the flexibility of adjustment has been brought about without complication and at nominal cost. The implement is, in addition, distinguished by its sturdiness and simple, straightforward design, the torsion bar which forms an important element of the combination being totally enclosed.

In the preferred embodiment discussed above, the rear end of the tubular support 50 is rigidly connected to the disc gang. Where it is desired to provide additional torsional effect, the tubular support 50 may be left floating relative to the sleeve 51 which surrounds it, simply by omitting the welding bead 53 and knocking out the pin 61 shown in Fig. 4. Under such circumstances any torsional resilience in the tubular support 50 will be effectively "in series" with the torsional resilience of the torsion bar 60.

While the present invention has been applied to a disc tiller for which it has particular advantage, it will be apparent to one skilled in the art that the discs may be replaced by other types of laterally spaced soil-engaging elements arranged in a gang without sacrificing the main advantages of the torsional mount.

I claim as my invention:

1. In a disc tiller, the combination comprising a disc gang, a frame having means for coupling the same to a tractor, a bracket mounted on the underside of said frame, a longitudinal tubular support journaled in said bracket and connected to said disc gang at a generally central position thereon, a gooseneck support rigidly connected to said longitudinal support at a point adjacent said bracket and connected to said gang at a point substantially offset from said central position, a torsion bar in said tubular support, said torsion bar being anchored to said support at its rear end and having a torque-transmitting connection with said bracket at its forward end, a stop on said bracket for limiting the tilting movement of the gooseneck and thereby defining the normal position of said gang, said torque-transmitting connection being adjustable for preloading the torsion bar and thereby establishing the ground reaction torque required to tilt said disc gang away from said stop.

2. In a disc tiller, the combination comprising a disc gang, a frame having means for supporting the same on a tractor, a bracket mounted on said frame, a longitudinal support having its forward end journaled in said bracket and rigidly connected to said disc gang at its rear end, a gooseneck support rigidly connected to said longitudinal support at a point adjacent said bracket and connected to said gang at a point substantially offset from said point of connection of said longitudinal support, a torsion bar coaxial with said longitudinal support, said torsion bar being anchored to said gang at its rear end and having a torque-transmitting connection with said bracket at its forward end, a stop on said bracket for limiting the bodily tilting movement of said supports and thereby defining the normal position of said gang, and means for preloading the torsion bar and thereby establishing the ground reaction torque required to tilt said disc gang away from said stop.

3. In a disc tiller, the combination comprising a disc gang, a frame adapted for connection to a tractor and arranged forwardly of the disc gang, a bracket mounted on said frame and having provision for rotary adjustment about a vertical axis, a tubular member disposed transversely of and connected to said disc gang at its rear end and journaled in said bracket at its forward end, a torsion bar mounted in said tubular member, said torsion bar being fixed to the tubular member at its rear end and having a torsion-transmitting connection with said bracket at its forward end so that tilting of said disc gang transversely of its axis by ground reaction is resiliently resisted by torsion developed in the torsion bar.

4. In a disc tiller, the combination comprising a disc gang, a frame adapted for connection to a tractor and arranged forwardly of the disc gang, a bracket mounted on said frame and having provision for rotary adjustment about a vertical axis, a tubular member disposed transversely of and connected to said disc gang at its rear end and journaled in said bracket at its forward end, a torsion bar mounted in said tubular member, said torsion bar being fixed to the tubular member at its rear end and having a torsion-transmitting connection with said bracket at its forward end and a stop member on said bracket for engaging the tubular member and thereby defining the normal position of the disc gang relative to said frame.

5. In a disc tiller, the combination comprising a disc gange, a frame adapted for connection to a tractor and arranged forwardly of the disc gang, a bracket mounted on said frame and having provision for rotary adjustment about a vertical axis, a tubular member disposed transversely of and connected to said disc gang at its rear end and journaled in said bracket at its forward end, a torsion bar mounted in said tubular member, said torsion bar being fixed to the tubular member at its rear end, an adjustable stop on said bracket for engaging the tubular member and thereby defining the normal position of the disc gang relative to said frame, and means mounted on the bracket for applying torsion to the torsion bar so that tilting of the disc gang transversely of its axis from its normal position due to ground reaction is resiliently resisted.

6. In a disc tiller, the combination comprising a disc gang, a frame adapted for connection to a tractor and arranged forwardly of the disc gang, a bracket mounted on said frame and having provision for rotary adjustment about a vertical axis, a gang-supporting member connected to said disc gang at its rear end and pivoted in said bracket at its forward end for tilting movement of the gang transversely of its axis, a stop on the bracket for engaging said gang-supporting member in its path of tilting movement and thereby defining a normal position of the disc gang, a torsion bar coupled to the disc gang at its rear end and having a torsion-transmitting connection with said bracket at its forward end for biasing the gang supporting member against the stop so that tilting of said disc gang transversely of its axis from its normal position due to ground reaction is resiliently resisted by torsion developed in the torsion bar.

7. In a disc tiller, the combination comprising a disc gang, a frame having means for coupling the same to a tractor, a frame plate spaced below said frame, means for rigidly connecting said frame plate to the frame with its members in spaced relation so as to provide access to the upper side of said frame plate, a bracket on the underside of said frame plate and pivoted thereto for angular positioning about a vertical axis, means for connecting the bracket to the disc gang, a row of teeth arcuately arranged on the upper face of said frame plate, said frame having an arcuate slot overlying said bracket, a locking member positioned in overlying relation to the slot and to the teeth on said frame, a screw extending through said member and through said slot releasably securing said member to said bracket, and a series of teeth formed on said locking member engageable with the teeth on said frame plate at selected angular positions for maintaining the bracket and connected disc gang in a desired orientation relative to said frame.

8. In a disc tiller having a frame adapted to be supported in a generally horizontal position and at least one disc gang comprising an elongated shaft with a plurality of discs mounted thereon and spaced apart axially of the shaft by collars rotatably mounted on the shaft, means supporting the disc gang on the frame for limited tilting movement in a vertical plane transversely of its axis comprising a tubular member rigidly connected at one end to one of the spacing collars of the disc gang and journaled at its other end on the frame, said member being disposed transversely of the axis of the disc gang and extending forwardly therefrom, and means imposing a bias on the disc gang comprising an elongated torsion bar extending through said tubular member, said torsion bar having a non-rotatable connection at one end with said one spacing collar and a non-rotatable connection at the other end with the frame, said last mentioned connection being angularly adjustable to vary the bias on the disc gang.

References Cited in the file of this patent

UNITED STATES PATENTS

| | | |
|---|---|---|
| 540,550 | Hisle | June 4, 1895 |
| 553,100 | Brunnemer | Jan. 14, 1896 |
| 615,718 | Kouns | Dec. 13, 1898 |
| 917,455 | King | Apr. 6, 1909 |
| 1,007,982 | Sharp | Nov. 7, 1911 |
| 1,239,091 | Dickinson | Sept. 4, 1917 |
| 1,382,364 | Jackson | June 21, 1921 |
| 1,505,875 | Earley | Aug. 19, 1924 |
| 1,550,062 | Dewend | Aug. 18, 1925 |
| 1,690,790 | Moody | Nov. 6, 1928 |
| 1,832,021 | Hand | Nov. 17, 1931 |
| 2,103,590 | Lefevre | Dec. 28, 1937 |